Dec. 17, 1968  G. E. WARNAKA  3,416,782
MOUNTING
Filed July 25, 1966
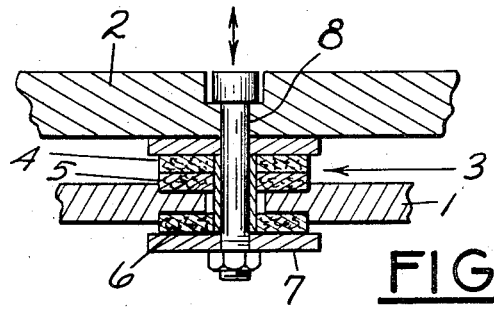
FIG. 1
FIG. 4
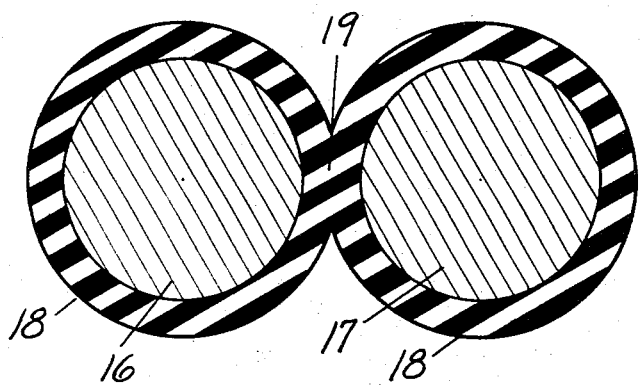
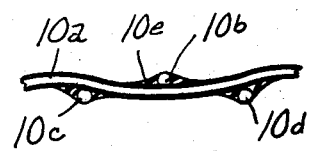
FIG. 3
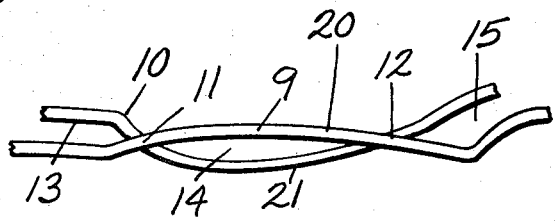
FIG. 2
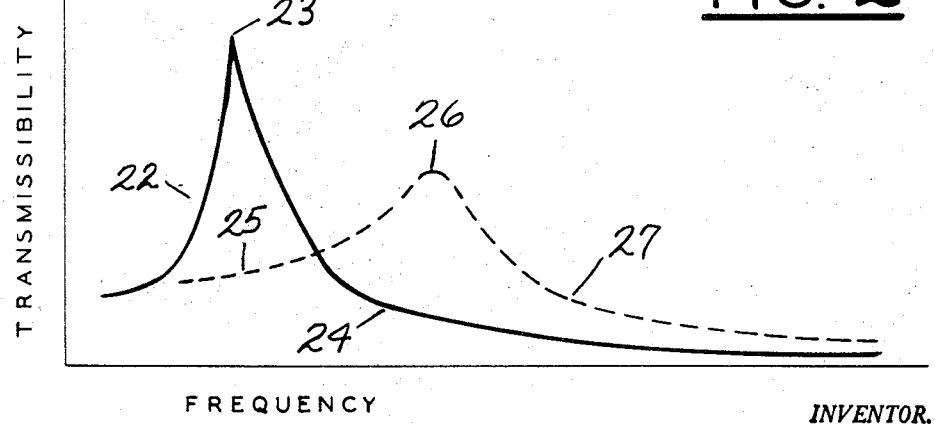
FIG. 5
INVENTOR.
Glenn E. Warnaka
BY Ralph Hammar
Attorney

3,416,782
MOUNTING
Glenn E. Warnaka, Erie, Pa., assignor to Lord Corporation, Erie, Pa., a corporation of Pennsylvania
Filed July 25, 1966, Ser. No. 567,750
11 Claims. (Cl. 267—1)

ABSTRACT OF THE DISCLOSURE

A compressed metal wire mesh mounting having an initial volume density of from 7 to 80% (7 to 80% wire; 93 to 20% voids) is improved by coating the compressed wires with a coating of viscoelastic damping material filling from 10 to 90% of the initial void space. Preferably the coating has a permanent sticky outer surface and is applied by dipping the mounting in a solution of the damping material and then evaporating the solvent.

---

This invention is intended to improve metal wire mesh resilient spring mountings by a thin tacky coating of polymeric damping material on the individual wires. The coating is of material having greater adhesion to the wires than to another like coating. Under vibration, adjacent coated wires are moved relative to each other, thereby dissipating energy.

In the drawing, FIG. 1 is a fragmentary elevation of a mounting, FIGS. 2 and 3 are diagrammatic views illustrating the damping action, FIG. 4 is an enlarged diagrammatic view showing two coated wires in contact with each other, and FIG. 5 is a vibration transmissibility curve.

In the drawing, 1 and 2 indicate supporting and supported members and 3 indicates a resilient mounting in load carrying relation between the members. The resilient elements of the mounting are annular spring members 4, 5, 6 of compressed metal wire mesh, the members 4, 5 being arranged between the member 2 and the upper side of member 1 to carry the gravity load and the member 6 being arranged between a washer 7 on a through bolt 8 and the under side of the member 1 to carry the upward or rebound forces.

Metal mesh wire springs are well known and are most commonly made of stainless steel wire. In one method of manufacture, wire is knitted in circular "stockings" which are cut in specified lengths and loaded into a die having an inside diameter corresponding to the finished spring. The metal mesh is compressed axially to the desired size. During the compression, the wires are bent past the yield point to take an initial set. The resultant stiffness depends upon the degree of compression which is specified in terms of the percentage of the envelope occupied by wire. If the wire mesh were completely completely compressed to solid metal, the density would be 100%. The density of the metal mesh spring available on the market ranges from a low of substantially 7% to a high of substantially 45%. Most commonly the density is in the range of 15% to 25%. The lower densities are used for light mountings while the higher densities are used for heavy duty mountings. The springs available on the market are compressed or formed in an axial direction and the spring rate is a maximum in the direction of the forming pressure and is much less in all directions at right angles to the forming pressure. By subjecting the metal mesh to both axial and radial forming pressures as described in application Ser. No. 510,208, the metal mesh mountings are suitable for both axial and radial loads. For mountings subjected to both axial and radial compression the density is in the range of from 10% to 80%.

The action of the spring under vibration is diagrammatically shown in FIGS. 2 and 3. FIG. 2 shows only two of the many wires which make up each spring. These wires 9, 10 are of random bent or curved shape, interlaced or felted or tangled together with spaced points 11, 12 of contact with each other and voids 13, 14, 15. FIG. 2 is highly diagrammatic. In use, the load is not applied to individual wires but is applied to the mass of wires and is transmitted through the mass at a multiplicity of contact or crossover points such as shown at 11, 12. For example, a load received by wire 9 from other wires (not shown) contacting it between points 11, 12 would be transmitted to wire 10 at crossover points 11, 12 and the intermediate span of wire 9 would be deflected into contact with the wire 10. This deflection would cause relative slippage at the crossover points 11, 12 which has heretofore been relied upon to introduce friction damping. Although FIG. 2 illustrates only two wires, it should be understood that load is received by wire 9 from a multiplicity of other wires and is transmitted to a multiplicity of other wires in addition to the wire 10.

In order to improve the damping, the individual wires of the metal mesh spring are coated with a thin coating of polymeric damping material which preferably has a permanent sticky outer surface. In a preferred form, this material may be selected from the class consisting of pressure sensitive adhesives and cured, uncured or partially cured elastomers which have a modulus of elasticity one tenth or less than the modulus of elasticity of the wires and an internal damping or hysteresis or loss factor ten or more times the internal damping of the wires. Pressure sensitive adhesives are a well known class of materials which have the property of adhering in response to pressure. Examples of pressure adhesives are Goodyear Pliobond, Minnesota Mining EC–847, EC–1300, EC–1870, Dow Corning DC–274 and DC–269. Uncured or partially cured elastomers or viscoelastic damping materials have similar sticky or tacky properties. Preferred examples of such elastomers are polyisobutylene, polysulfide. For other viscoelastic damping materials see Product Engineering, Apr. 17, 1961, pages 44–56. Cured damping materials have the damping property but are not sticky. FIG. 4 shows on greatly enlarged scale two wires 16, 17, each having a tacky coating 18. At the points where the coated wires come into contact, the coatings unite as indicate at 19 and form an adhesive connection between adjacent wires. The connections such as indicated at 19 would exist between the crossover connections such as shown at 11, 12 in FIG. 2. Because of the adhesive connection, the sliding motion heretofore relied upon to introduce damping, now becomes a shearing of the sections 19. The adhesive connections such as shown at 19 could also exist if sections 20, 21 of the wires 9, 10 were moved into contact with each other under forces accompanying large amplitude vibrations. Since these forces are of a reciprocating or alternating nature, the forces which tend to move the sections 20, 21 into contact with each other also tend to move the same sections out of contact with each other. This results in a repetitive making and breaking of the adhesive connections such as indicated at 19 and a dissipation of energy which is useful in cutting down or damping the amplitude of vibration. Because the sections 20, 21 are separated from each other, they are not brought into contact with each other until the amplitude of vibration exceeds a threshold value. Another effect of the polymeric coating material is to stiffen the individual wire "beams" that exist from one point of contact to another by changing the supports from "simply supported" to "elastically built-in." This is indicated in the enlarged sketch, FIG. 3, where a single wire 10a receives load from wire 10b and is supported by wires 10c and 10d. Elastomeric gussets 10e connect the wires 10a–d inclusive and are flexed as the beam is loaded, and by virtue of their high inherent damping, contribute significantly to the overall damping level of the composite. This effect is due to the internal damping or hysteresis of the polymeric damping material and would be produced regardless of whether the material were cured or uncured, tacky or not.

There are, accordingly, three mechanisms by which damping is improved by the coatings on the individual wires. First, there is the shearing of the coatings at the crossover points between the wires. This effect is present at all times and is independent of the amplitude of vibration. This effect depends upon the internal damping of the coatings and is present in all coatings whether sticky or not. A second effect is the make and break action such as would take place by the alternate movement of the sections 20, 21 into and out of contact with each other. This effect takes place with sticky coatings when the amplitude of vibration is large enough to cause the required movement and the damping introduced by this mechanism is accordingly amplitude sensitive. Since the large amplitude vibrations ordinarily take place at low frequencies and the small amplitude vibrations at high frequencies, the damping introduced by the make and break action also appears to be frequency sensitive. The third effect, the flexing of the elastomeric gussets 10e, like the shearing action, is present with all damping materials, whether sticky or not. The improvement obtained by these effects is illustrated in the vibration transmissibility curve of FIG. 4. Curve 22 is the typical vibration transmissibility curve in which the vibration transmitted is first amplified, reaching a peak at resonance 23 and is then isolated as indicated by curve 24. This curve is typical for metal mesh springs. After the individual wires were coated with the sticky damping material, the vibration isolating characteristics indicated by curve 25 where the transmissibility increases to a peak at resonance 26 and then falls off along curve 27. It will be noted that the resonance frequency is shifted to a higher frequency due to the introduction of damping. Also due to damping, the percentage isolation at higher frequencies is somewhat less. However, the vibration isolation at higher frequencies is adequate and the reduction in the large amplitude vibrations is substantial.

The coating of the individual wires of the wire mesh spring is conveniently carried out after the springs have been subjected to forming pressure. The springs then have the required spring characteristics. The formed spring may be dipped into a solution of tacky material and a solvent so as to coat all of the surface of the wires. The thickness of the coating on the individual wires may be determined by the percentage of solvent in the solution. After dipping, the springs may be centrifuged and dried, leaving on the individual wries the tacky coating from which the improved damping characteristics are obtained. The coating reduces but does not eliminate the voids. After coating, from 10–90% of the initial void space is filled with the coating. Since the damping material is substantially incompressible, some void space is necessary to permit flexing of the wires. The particular curves of FIG. 5 were taken on a wire mesh mounting initially compressed in an axial direction to a volume density of 20% (20% wire, 80% voids) which was impregnated with 50% of its volume of polyisobutylene leaving 30% of its volume voids.

What is claimed as new is:

1. In a vibration isolating resilient mounting having a load carrying element comprising a mesh of metal wires having a stable spring rate developed by being initially compressed into a block having substantially from 20 to 93% uniformly dispersed voids throughout the block by pressure stressing the wires beyond their yield point, the improvement which comprises coatings on said wires of material characterized by a modulus of elasticity one tenth or less than the modulus of elasticity of the wires and an internal damping or hysteresis or loss factor ten or more times the internal damping of the wires, the coatings on adjacent wires in contact with each other being united to each other and the coatings partially filling the voids in the block whereby the transmissibility of large amplitude vibrations is reduced.

2. The mounting of claim 1 in which the coatings have a permanent sticky outer surface.

3. The mounting of claim 1 in which the coatings are selected from the class consisting of cured, uncured or partially cured elastomers.

4. The mounting of claim 2 in which the coatings have the property of adhering to the wires with greater tenacity than to another like coating.

5. The mounting of claim 1 in which the block of wire mesh is initially compressed along one axis to a volume density of 7–45% and after coating from 10–90% of the initial voids are filled by the coatings.

6. The mounting of claim 1 in which the coatings form elastomeric gussets which unite the wires in contact with each other.

7. The mounting of claim 1 in which the block of wire mesh is initially compressed along one axis and is further compressed along an axis at right angles to the first axis to substantially double the density.

8. The mounting of claim 7 in which the density of the wires after initial compression is in the range of 7–45% and the density of the wires after the further compression is in the range of 10–80% and in which the coatings partially fill the space between the wires so the block has substantially uniformly dispersed voids.

9. The mounting of claim 7 in which the density of the wires after initial compression is in the range of 15–25% and the density of the wires after the further compression is in the range of 25–50% and in which the coatings partially fill the spaces between the wires so the block has substantially uniformly dispersed voids throughout.

10. The method of making a resilient mounting which comprises compressing a mesh of metal wires into a block having substantially uniformly dispersed voids throughout by pressure stressing the wire beyond their yield point to develop a stable spring rate, and impregnating the block with a damping material characterized by a modulus of elasticity one tenth or less than the modulus of elasticity of the wires and an internal damping one hysteresis or loss factor ten or more times the internal damping of the wires to partially fill the spaces between the wires in the block.

11. The method of claim 10 in which the damping material is dissolved in a solution which is evaporated after impregnation of the block.

References Cited

UNITED STATES PATENTS

| | | | |
|---|---|---|---|
| 2,058,165 | 10/1936 | McCoy | 267—61 |
| 2,462,316 | 2/1949 | Goodloe | 267—1 |
| 2,869,858 | 1/1959 | Hartwell | 267—1 |
| 2,992,469 | 7/1961 | Hose et al. | 117—99 |
| 3,027,272 | 3/1962 | Ratzel | 177—99 |

ARTHUR L. LA POINT, *Primary Examiner.*

U.S. Cl. X.R.

117—128.4